United States Patent [19]

Kannegundla

[11] Patent Number: 5,285,286
[45] Date of Patent: Feb. 8, 1994

[54] APPARATUS FOR TESTING IMAGE SENSORS THAT SIMULTANEOUSLY OUTPUT MULTIPLE IMAGE BLOCKS

[75] Inventor: Ram Kannegundla, Rochester, N.Y.

[73] Assignee: Eastman Kodak Company, Rochester, N.Y.

[21] Appl. No.: 825,224

[22] Filed: Jan. 24, 1992

[51] Int. Cl.$^5$ .............................................. H04N 5/335
[52] U.S. Cl. ..................................... 348/187; 348/246; 348/250
[58] Field of Search ....................... 358/213.11, 213.26, 358/213.13, 213.15, 213.17, 213.29, 212; 250/208.1; H04N 5/335

[56] References Cited

U.S. PATENT DOCUMENTS

| | | | |
|---|---|---|---|
| 4,280,141 | 6/1981 | McCann et al. | 358/213.26 |
| 4,322,752 | 3/1982 | Bixby | 358/213.27 |
| 4,638,354 | 1/1987 | Denimal | 358/106 |
| 4,638,371 | 1/1987 | Milch | 358/293 |
| 4,785,353 | 11/1988 | Seim | 358/213.26 |

*Primary Examiner*—Joseph Mancuso
*Assistant Examiner*—Tuan V. Ho
*Attorney, Agent, or Firm*—Raymond L. Owens

[57] ABSTRACT

An apparatus for producing a visual image stored in a multi-output CCD image sensor for CCD image analysis which has a plurality of analog shift registers. Analog multiplexers are used to eliminate the need for a frame store.

4 Claims, 4 Drawing Sheets

APPARATUS FOR TESTING IMAGE SENSORS THAT SIMULTANEOUSLY OUTPUT MULTIPLE IMAGE BLOCKS

FIELD OF THE INVENTION

The present invention relates to displaying an output of a CCD image sensor for test and analysis of the CCD.

BACKGROUND OF THE INVENTION

Charge-coupled devices (CCD) image sensors are photosensitive devices which are frequently used in electronic imaging. As technology has advanced, the resolution of these CCD image sensors has increased and the number of image sensor sites has increased. These sensor sites are called pixels. A line at a time of information is read in parallel into a shift register. the information is sequentially read out of the shift register. A problem with this arrangement is that as the number of pixels increases, the time to read out the charge from all the pixels increases and hence the frame rate actually decreases. In order to maintain or increase the frame rate of an area image sensor, two approaches have been used. The first is simply to increase the horizontal shift register clock frequency to increase the readout rate and the second is to employ analog, multiple shift registers and readout information from each shift register through an output terminal to increase the frame rate without changing the horizontal clock frequency or both.

Normal video image sensors are designed for 30 frames per second. There are, however, situations where it is highly desirable to have an increasing rate of frames per second. In some specific scientific applications it is desirable to have at least 40,000 frames per second. Such type of arrangements require the use of the multiple readout shift registers. With large numbers of pixels and multiple outputs, it is important to analyze the output of a CCD image sensor 10 to determine whether there are defects in the image sensor pixels.

A real time display (image) on a monitor is needed for test and analysis. In the past, this has been accomplished using expensive frame stores. Turning now to FIG. 1, we see a CCD image sensor 10 with which the present invention can be used. To use a conventional display there can, for example, be 512 pixels per line and 512 lines. In FIG. 1, there are 64 shift registers 11, one for each block of image data. More particularly, there are 64 blocks of information in the CCD. Each shift register 11 corresponds to a single block of image data. Each output from one of the 64 analog shift registers 11 is coupled to a conventional sample and hold circuit 14.

Turning now to FIG. 2, sample and hold circuits 14 provide input into individual A/D converter 17. Accordingly, since there are 64 blocks, there are 64 sample and hold circuits and 64 A/D converters. Under the control of timing and control circuit 25 the sample and hold circuits 14 deliver analog data to A/D converters 17. The A/D converters deliver digital pixel data to storage locations in a frame store 16 under the control of microcomputer 22. The number of image locations in the frame store 16 will correspond to twice the total number of pixels in the CCD image sensor 10. For example, the first A/D converter 17 feeds a dual block (two frames) store 1. This corresponds to the traditional two frames required to display a complete image. The microcomputer 22 control all the necessary programming for providing timing and addressing information into the frame store 16 and to deliver each digitized pixel signal to its appropriate location in each dual block store in the frame store 16. It also controls the operation of the readout from the frame store 16 to a digital to analog converter 27 which applies its output to a display unit 26. A keyboard 28 associated with the microcomputer, permits a user to control the frame store in accordance with software programming for display on the CRT display unit (monitor) 27.

For a more complete disclosure of a system which uses a CCD with a plurality of blocks of information and control electronics see commonly assigned U.S. Pat. No. 4,638,371 to Milch the disclosure of which is incorporated by reference herein.

When it is desired to visually determine if there are defects in the CCD, then a predetermined target pattern is focused onto the CCD and repeatedly readout from the CCD into the frame store 16. Pixel information is then delivered into the display 26 for visual test and defect analysis. Such defects can be bright point defects and dim point defects. Using this arrangement as a test device requires expensive frame store arrangements as well as special programming.

For a CCD sensor with single output the image is normally displayed onto a NTSC display CRT or monitor or onto a high persistence display or monitor depending on the frame rate at which the sensor is operating. If the sensor operates at less than 10 frames per second then the flicker on the monitor becomes unacceptable. For such sensor testing the video signal from the sensor is sent to a frame store and refreshed onto the monitors at 60 frames per second. This means the picture on the monitor is updated at the frame rate of the sensor but displayed at 60 frames per second. This arrangement normally needs a frame store and an associated microcomputer as shown in FIG. 2. Now for a sensor with 64 outputs we need 64 frame stores each with its high speed A/D. The 64 frame stores need to be synchronized and coordinated by a computer. This requires the development of expensive necessary software. For testing the wafers and packaged devices this elaborate expensive arrangement will increase the cost of the device, but it should be recognized that all that is needed for the test purposes is to identify bright point defects and dim points, charge transfer inefficiencies and smear.

SUMMARY OF THE INVENTION

It is an object of this invention to provide apparatus for analyzing defects in a multi-output CCD image sensor which does not need a frame store.

This object is achieved by apparatus for producing on a display without using a frame store, an image from a predetermined pattern of blocks of image data stored in a multi-output CCD image sensor for image analysis to determine defects in such CCD image sensor having a plurality of analog shift registers each associated with a particular block of image data, comprising:

(a) a plurality of first addressable analog multiplexers, each such first analog multiplexer coupled to a plurality of analog shift registers;

(b) a second addressable multiplexer coupled to the outputs of the first analog multiplexers; and (c) timing and control means for sequentially addressing the first multiplexers and the second multiplexers so that the output of each shift register is coupled to the display and each block of image data is sequentially coupled to the display at a rate selected so that an image of the pattern provided by the blocks of image data is effectively produced on the display for visual analysis.

BRIEF DESCRIPTION OF THE DRAWINGS

FIG. 2 also includes a standard frame store, display and other electronics;

DESCRIPTION OF THE PREFERRED EMBODIMENTS

Figure 1:
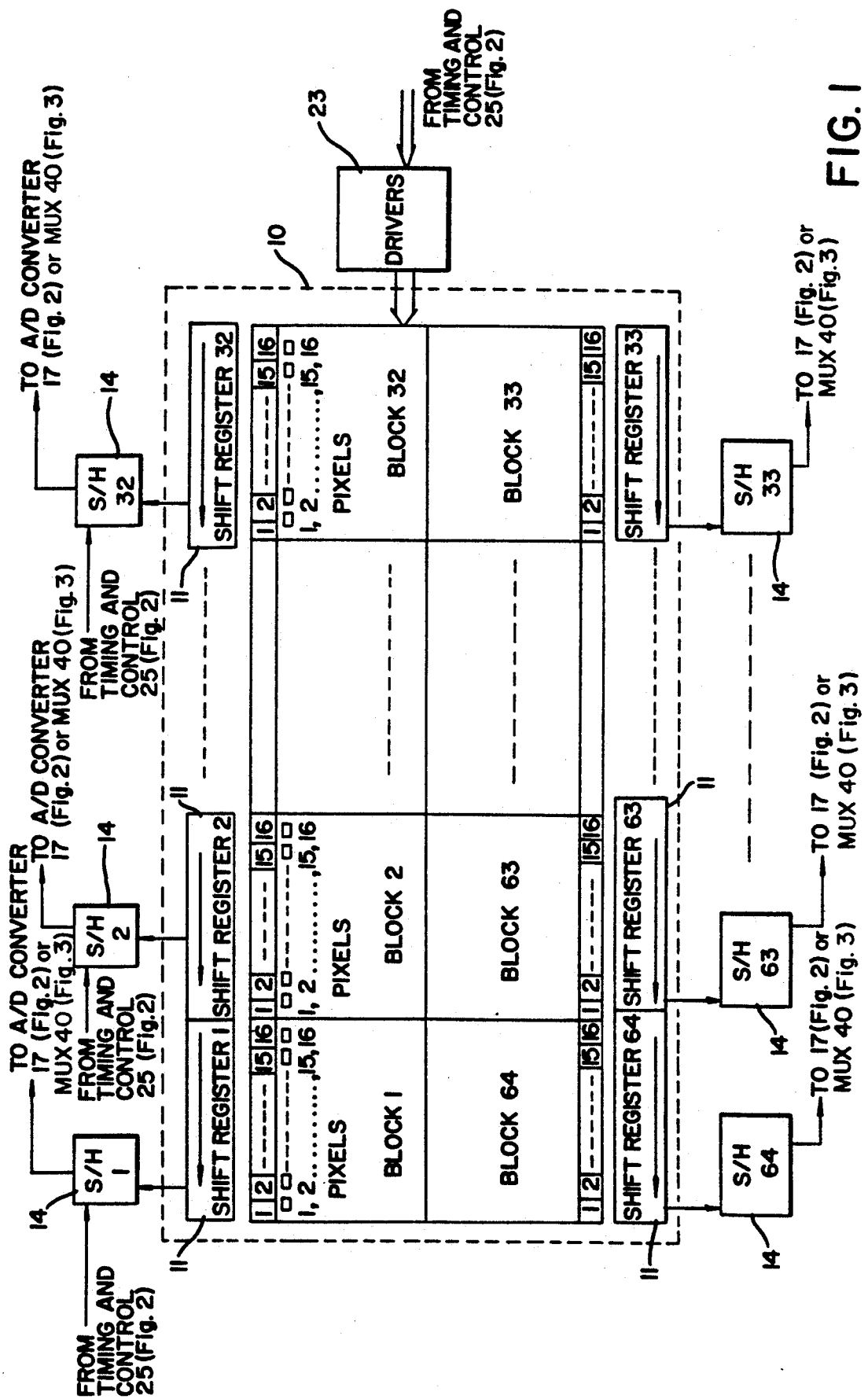
FIG. 1 is a schematic plan view of a CCD image sensor which the present invention can analyze for defects.

Where devices correspond to those already described in connection with FIGS. 1 and 2 the same reference numerals will be used.

Figure 2:
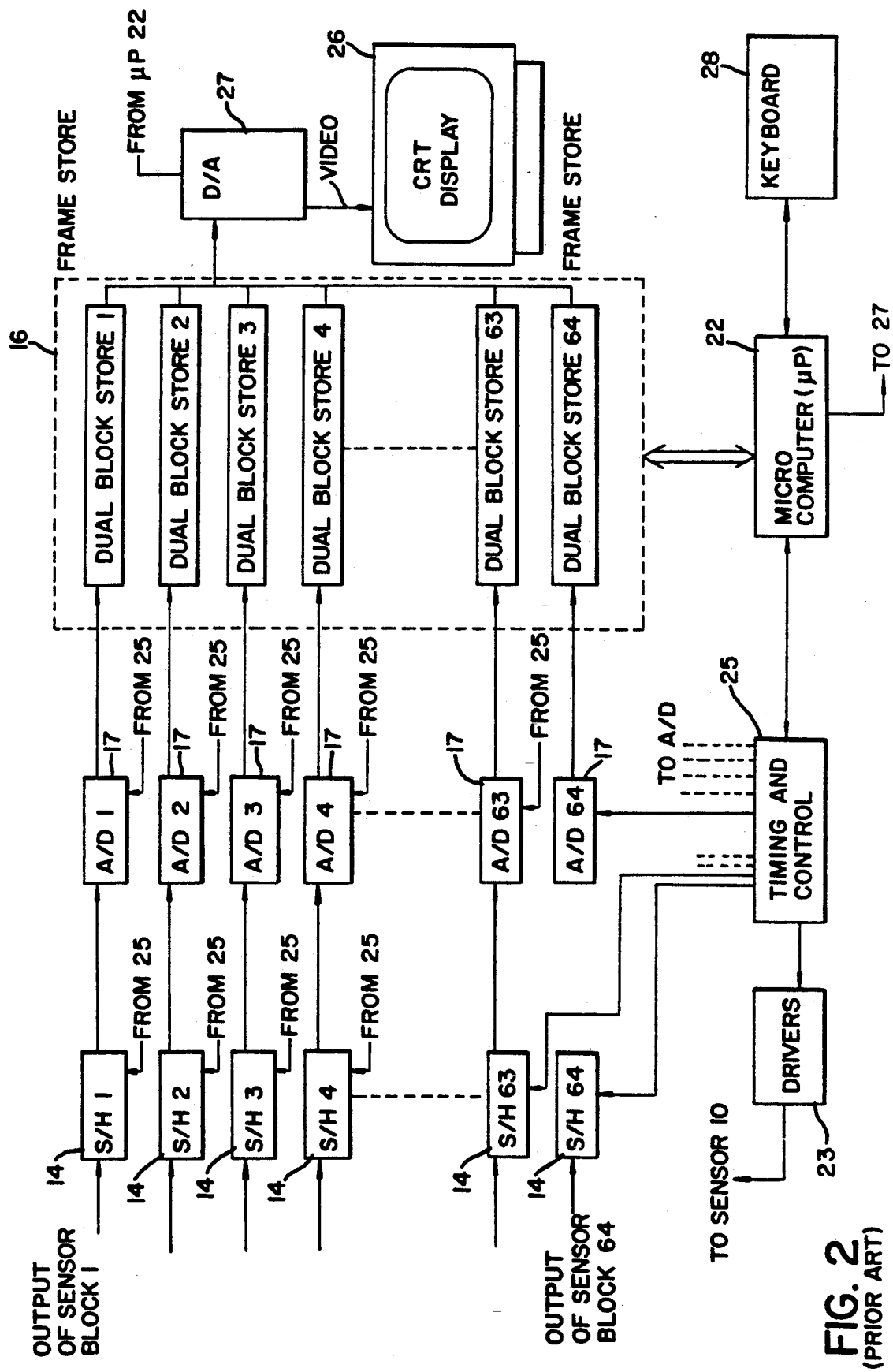
FIG. 2 shows prior art control electronics for displaying a target image of the CCD on the monitor of FIG. 1.
Figure 3:
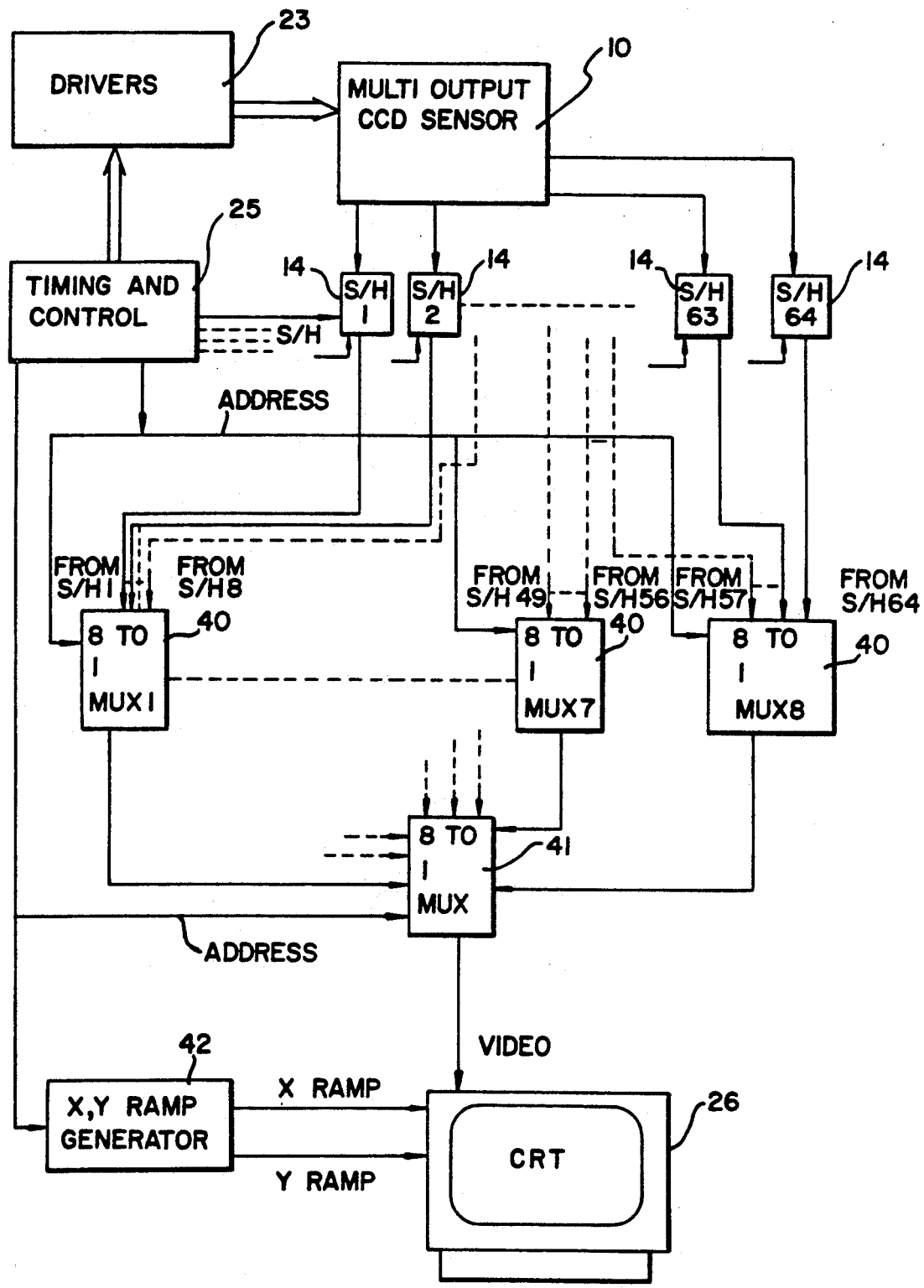
FIG. 3 is a block diagram of apparatus in accordance with the invention.

Turning now to FIG. 3, drivers 23 under the control of timing and control circuit 25 cause the readout of information a line at a time from a block of image data into shift registers 11 (see FIG. 1). The output of each shift register is as in FIG. 1 connected to a sample and hold circuit 14. the present invention uses eight 8 to 1 first addressable analog multiplexers (MUX) 40. Each of these first addressable analog multiplexers receives inputs from eight sample and hold circuits 14. the upper left hand MUX 40 has eight input data lines, one each from the first S/H circuits 14. The timing and control circuit provides address lines to each MUX as well as to driver 23 and S/H circuits 14. A second addressable MUX 41 is coupled to the output of each MUX 40. In order to display the first block of information the address line selects the upper left hand MUX 40 and connects MUX 41 to it. Analog data is sequentially shifted out only from the first sample and hold circuit 14 sequentially through the upper left hand MUX 40, through the bottom MUX 41 to the CRT 26.

Blocks 1–32 can contain one-half of a total target image and blocks 33–64 can contain the other half of such target image. So for example, one-half of the target image (blocks 1–32) is displayed for analysis and test and thereafter the other one-half target image is displayed for analysis and test. When the term "frames per second" has been used, it is in reference to one-half of the target image. Therefore, if we refer to 90 frames per second that means that one-half of a target image has been displayed, 90 times per second on the displayed image.

The first block of data is displayed on the CRT. The control operation of X, Y ramp generator 42 will be described later. After the first block is displayed, the second block is the displayed by changing the address signal to the upper left hand MUX 40 to connect it to the second S/H circuit 14. The MUX 41 remains connected to the left hand MUX 40. This process is sequentially repeated until the first 32 blocks (one-half the target image) are displayed. After this one-half target image is tested and analyzed, the second one-half target image (blocks 33–64) will be displayed. In order to display the 64th block, for example, the upper right hand MUX 40 is addressed and the 64th S/H 14 is connected and the lowest MUX 41 connected to this MUX 40 and the 64th S/H 14 is direct fed to the CRT 26.

In accordance with this invention the multiple outputs of the CCD image sensor 10 are displayed onto a single CRT without using a frame store. The present invention can be used for not only an area sensor as described but also linear sensors.

In order to display an image on a CRT display without noticeable flicker to effectively produce an image for analysis, a frame should be displayed at 60 or greater frames per second. To determine defects, only bright and dim point defects need be identified.

The sensor 10 has 64 blocks and each block of image data has 256 lines while line in a block has 16 pixels. By clocking the horizontal shift registers 11 of the sensors at 21 MHz the frame rate of the sensor would be 3000 frames per second. One block after another at a time is displayed as explained above. Each block corresponds to a partial image of one of the successive frames being read by the sensor and displayed on the monitor. Thus, for displaying 32 outputs (one frame) on a monitor, the frame rate of the monitor will be 3000/32 frames per sec which is about 93 frames per second. The produced image which is quite stable for visual analysis.

Figure 4A:
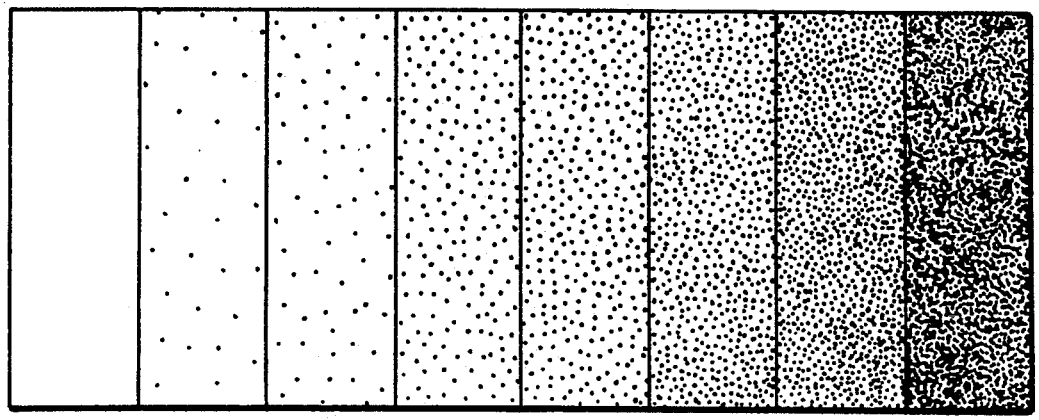
FIGS. 4a, b and c depict the timing diagram for the CRT of FIG. 3 which has only eight blocks of image data.
Figure 4B:
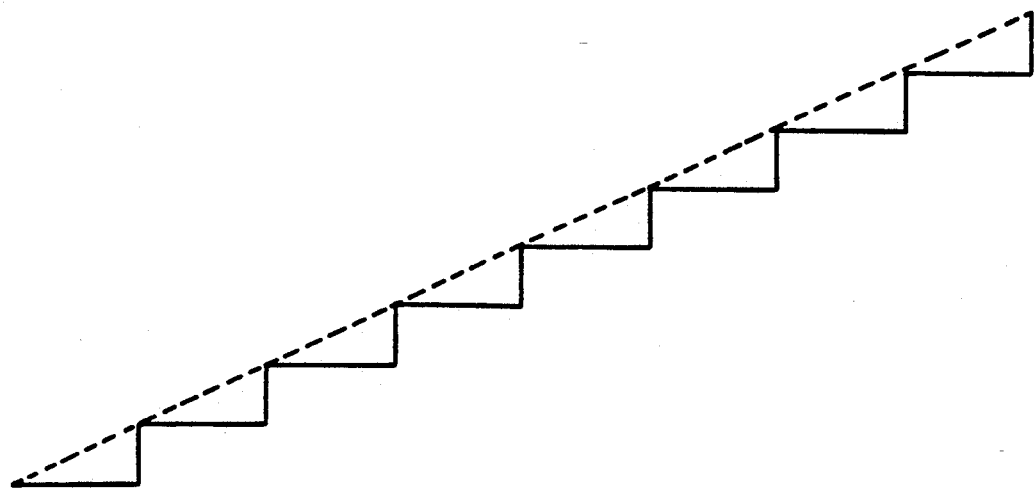
Figure 4C:
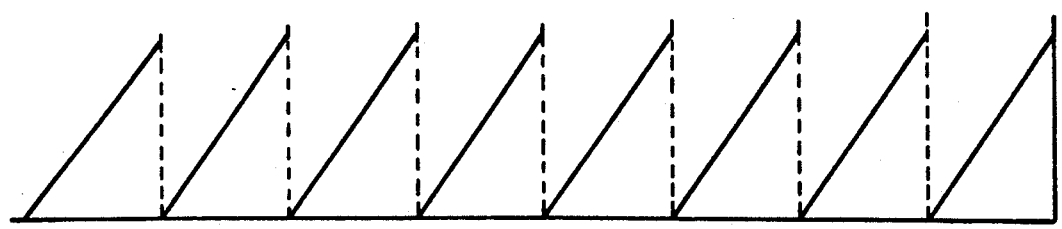

The process of producing X,Y ramp waveforms the CRT 26 for displaying the successive block for clarity of information on the CRT 26 is shown in FIG. 4a. A pattern of only 8 blocks of information are shown in the FIG. 4a. Block number 1 which is shown as white is displayed first. The X,Y ramp generator 42 in response to timing and control 25 produces X ramp and Y ramp signals. The X ramp for the CRT is for each line is shown in FIG. 4b. The Y ramp is shown in FIG. 4c. As is evident, the electron beam on the monitor scans for 256 lines from left to right for a very small length on the monitor. After the complete of painting the first block the beam moves to the adjacent to the first back which is decided by the X ramp. This process is repeated until the end of the completion of the specified number of blocks after which the beam moves back to the upper left hand corner where it really started. This type of display is different from the normal display in which one line on the entire monitor is displayed after another.

The invention has been described in detail with particular reference to certain preferred embodiments thereof, but it will be understood that variations and modifications can be effected within the spirit and scope of the invention.

What is claimed is:

1. Apparatus for producing an image from a predetermined pattern of blocks of image data stored in a multi-output image sensor on a display without using a frame store in order to determine defects in such image sensor, the image sensor having a plurality of analog shift registers each associated with a corresponding block of image data, for serially shifting out its corresponding block of image data, image line by image line, to an output of the analog shift registers, wherein each block of image data is simultaneously serially shifted out of the multi-output image sensor comprising:

(a) a plurality of first addressable analog multiplexers, each such first analog multiplexer having inputs coupled to the outputs of a plurality of the analog shift registers;

(b) a second addressable multiplexer having inputs coupled to outputs of the first analog multiplexers; and (c) timing and control means for sequentially addressing the first multiplexers and the second multiplexers so that the output of each shift register is coupled to the display and each block of image data is sequentially coupled to the display at a rate selected so that an image of the pattern provided by the blocks of image data is effectively produced on the display for visual analysis.

2. The apparatus of claim 1 wherein the timing and control means further includes X,Y generator means for translating the position that each block of image data is recorded on the display.

3. The apparatus of claim 1 further including sample and hold circuits each connecting the output of one of the analog shift registers to the input of one of the first addressable multiplexers.

4. The apparatus of claim 1 wherein the blocks of image data include a first set of blocks corresponding to one-half of a target image and a second set of blocks corresponding to the other one-half of the target image.

* * * * *